Nov. 24, 1942.  J. SANDUSKY  2,302,719
ELECTROLYTE LEVEL CONTROL DEVICE FOR STORAGE BATTERIES
Filed Dec. 30, 1940

Inventor
J. Sandusky
by G. E. Maybee
ATTY.

Patented Nov. 24, 1942

2,302,719

UNITED STATES PATENT OFFICE 2,302,719

ELECTROLYTE LEVEL CONTROL DEVICE FOR STORAGE BATTERIES

Julius Sandusky, Toronto, Ontario, Canada

Application December 30, 1940, Serial No. 372,248

11 Claims. (Cl. 136—177)

This invention relates to an electrolytic level control device for storage batteries such as shown and described in my Patent No. 2,250,817, dated July 29th, 1941, and the object of the present invention is to provide a device of this kind which is adapted to be filled by the filling means commonly used in the manufacture of storage batteries, and also to provide positive means of indication that the water in the battery has reached a predetermined maximum height when being refilled.

Figure 1:
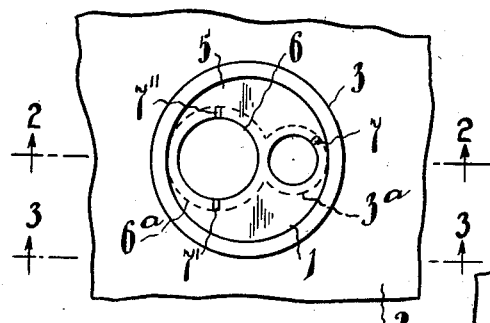
Figure 4:
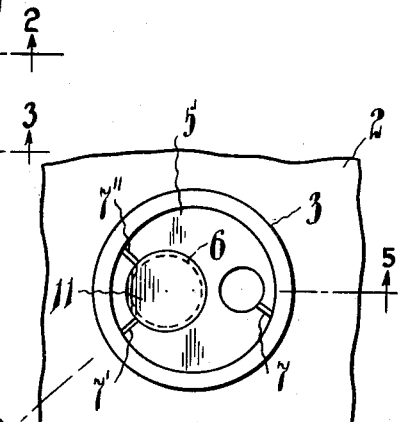
Figure 2:
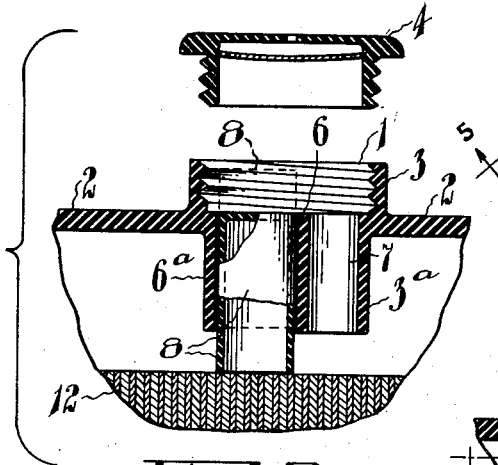
Figure 5:
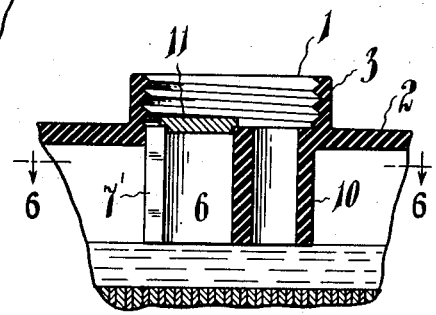
Figure 3:
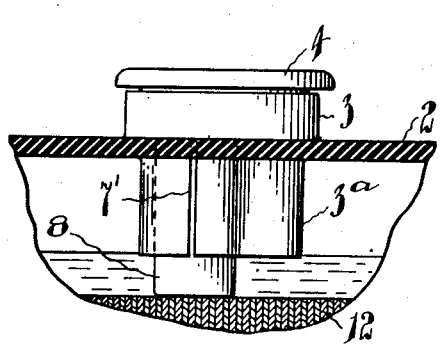

The invention is hereinafter particularly described and illustrated, by way of example, in the accompanying drawing in which Figure 1 is a plan view of part of the top of a storage battery showing one filler opening;

Figure 2 a vertical section on the line 2—2 in Figure 1;

Figure 3 a fragmentary vertical section on the line 3—3 in Figure 1;

Figure 4 a plan view of part of the top of the battery showing the filler opening with the cap removed, and illustrating a modified construction;

Fig. 5 a vertical section on the line 5—5 in Figure 4; and

Figure 6:
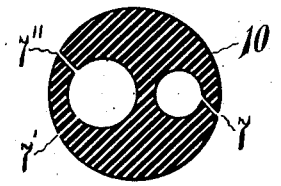

Figure 6 a cross section on the line 6—6 in Figure 5.

In the drawing corresponding parts in the different figures are identified by the same numerals.

The construction of the battery is well known and therefore only such parts thereof as are relevent to the present invention are indicated. A filling opening 1 is formed in the top of the battery casing 2. An outwardly extending boss 3 surrounds the filler opening, said boss being threaded to receive a cap 4 which may be of any suitable construction, and which is shown in Figure 2 above the filler opening and in Figure 3 mounted on the filler opening and screwed into the boss 3.

The interior of the boss forms a filling passage which has an extension of less diameter than the diameter of the interior of the boss formed by a tube 3ª which extends from a point approximately flush with the top of the casing 2 to a point within the cell below the top of the casing and spaced from the battery plates 12. The extension tube 3ª is eccentric to the boss 3 and adjacent one wall thereof, leaving a flat shoulder which forms a baffle 5 within the filling passage.

A circular opening 6 is formed in the baffle and has a downward extension 6ª below it forming a depending tube of a length substantially equal to the length of the extension tube 3ª. It will be understood that an air-tight space is formed between the bottom of the extension of the filler tube 3ª and the top of the battery cell and that the normal level of the electrolyte in the cell when filled is approximately at the bottom of said extension 3ª.

A vent to permit the escape of gases generated when the battery is charged is provided. In Figures 1, 2 and 3 the vent is formed by three longitudinal slots 7, 7', 7". The slot 7 extends longitudinally of the extension 3ª from the bottom to the top of the wall thereof communicating with the part of the filler tube formed by the boss 3. The other slots 7', 7" are located in the wall of the baffle tube 6ª. The slots are preferably about $3/64$" wide and are of such dimensions that water flowing over them tends to form a seal to prevent escape of air from the space between the bottom of the filling tube and the top of the battery cell during the filling operation. The diameter of the reduced portion of the filler tube is preferably about $3/8$" and the diameter of the opening in the baffle about $5/8$". The thickness of the walls or shell of the tubes where the slots are formed therein is preferably $3/32$" to $1/8$".

A float 8 is mounted in the baffle opening and extends down through the baffle tube 6ª fitting closely therein but normally slidable therein. Satisfactory results are obtained if the diameter of the float is about $3/64$" smaller than the diameter of the tube 6ª. The length of the float is greater than the length of the baffle tube 6ª and the lower end of the float normally rests on the plate 12, although it will be understood that some other stop may be provided for positioning the float 8. When the float is resting on the battery plates the top thereof is normally flush with the surface of the baffle 5. The float is preferably formed of moulded or cast hard rubber having walls about $1/64$" to $3/64$" thick and may be open at the bottom as shown or if desired fully enclosed.

In filling the battery, water is poured on the baffle 5, preferably on top of the float, and flows over the upper ends of the slots 7, 7', 7" sealing them, and through the downward extension of the filler tube, being directed against the slot 7 in its passage through the said extension, sealing the same. After the water reaches the lower end of the filler tube extension 3ª the air in the space below the top of the battery is compressed as more water is poured in. The water seal on the vent formed by the slots 7, 7', 7" and the crevice or space between the float 8 and the tube 6ª prevents the escape of air, therefore pressure is exerted on the water in the cell. There is a certain amount of friction between the float 8 and the walls of the baffle tube 6ª, and it is probable that the water around the float forms a film causing a certain adhesion of the float to the said walls of the baffle tube 6ª giving an initial resistance to sliding movement. Air is also compressed within the float. Eventually, the pressure on the float causes it to suddenly rise to the position shown in dotted lines in Figure 2. In practice this occurs when the water level is slightly above the lower end of the filler tube 3ª, about 1/16". It will be noted that the rise of the float is not gradual, but a sudden movement, which indicates to the operator that the battery has been filled to the proper level. The float will continue in its raised position as long as water is poured into the battery, but the operator will be notified by the rise of the float to discontinue the filling operation. As soon as the operator discontinues pouring water, the seal on the vent will open to permit escape of air from the top of the cell and the float will immediately drop to its previous normal position resting on the top of the battery plate 12.

In the manufacture of batteries, the batteries are filled by an automatic device having two tubes, both of which are inserted within the cell. One of these fills the battery with electrolyte. The other draws the air from the battery. The positive withdrawal of the air avoids the formation of air pockets and eliminates air pressure in the battery so that the filling of the battery is done quickly and accurately. This initial filling operation takes place before the float is inserted. The baffle opening is of sufficient diameter to accommodate the automatic filling tube, and the air removing tube is accommodated by the reduced portion of the battery filler passage. After the initial filling has taken place, the float is inserted in the baffle opening 6 and is used in the manner above described for subsequent filling of the battery.

A slightly modified form of the device is illustrated in Figures 4, 5 and 6. In this construction the reduced portion of the filler tube and the baffle opening in the tube are cut or moulded from a single cylindrical plug 10. The float 8 may be mounted in the baffle opening 6 in the same manner as shown in Figures 1, 2 and 3, but if desired a plate 11 may be substituted for the float. This plate may be removed for the initial filling of the battery, as explained above, and replaced to complete the baffle. In subsequent filling the water will be poured on the plate and will flow over the vent formed by the slots 7, 7', 7" and down through the reduced part of the filler tube until the water reaches the bottom of the filler tube, when it will rise in the filler tube and indicate that the battery is filled to the proper level, in the same manner as described in my Patent 2,250,817, thus indicating to the operator that the battery is sufficiently full. It will further be noted that the slots 7', 7" are adjacent one side of the baffle at a point where the wall of the plug 10 is thinnest.

In the description reference is made to the filler tube and the baffle tube, but it is not intended by the use of this expression to indicate that these tubes are necessarily round or circular in horizontal cross section, although in practice that is the preferable form.

Although the invention is described in some detail, it will be understood that the applicant is not limited to such details except as specified in the annexed claims.

What I claim as my invention is:

1. In an electrolytic level control device for storage batteries, a cell having a filling opening therein; a filling passage extending downwardly from said opening into said cell, the walls of the passage forming a substantially air-tight space outside the passage between the bottom of the passage and the top of the cell; a vent communicating between the said passage and the air space within the top of the cell, said vent being of such dimensions that water flowing over it tends to form a seal; a baffle in said passage adapted to direct water passing through said passage over the vent; an opening in said baffle communicating with the interior of the cell; and a removable closure for said baffle opening.

2. In an electrolytic level control device for storage batteries, a cell having a filling opening therein; a filling passage extending downwardly from said opening into said cell, the walls of the passage forming a substantially air-tight space outside the passage between the bottom of the passage and the top of the cell, the outlet end of the passage being of less inside diameter than the inlet or mouth end; a vent communicating between the said passage and the air space within the top of the cell, said vent being of such dimensions that water flowing over it tends to form a seal; a shoulder between the inlet and outlet ends of the pasage forming a baffle in said passage adapted to direct water passing through said passage over the vent; an opening in said baffle communicating with the interior of the cell; and a removable closure for said baffle opening.

3. In an electrolytic level control device for storage batteries, a cell having a filling opening therein; a filling passage extending downwardly from said opening into said cell, the walls of the passage forming a substantially air-tight space outside the passage between the bottom of the passage and the top of the cell; a vent communicating between the said passage and the air space within the top of the cell, said vent being of such dimensions that water flowing over it tends to form a seal; a baffle in said passage adapted to direct water passing through said tube over the vent; an opening in said baffle communicating with the interior of the cell; and a float slidably mounted in the baffle and fitting the side walls of said baffle opening.

4. In an electrolytic level control device for storage batteries, a cell having a filling opening therein; a filling passage extending downwardly from said opening into said cell, the walls of the passage forming a substantially air-tight space outside the passage between the bottom of the passage and the top of the cell; a vent communicating between the said passage and the air space within the top of the cell, said vent being of such dimensions that water flowing over it tends to form a seal; a baffle in said passage adapted to direct water passing through said tube over the vent; an opening in said baffle communicating with the interior of the cell; a tube extending from said opening into the cell; and a float slidably mounted in the baffle and fitting the side walls of said baffle opening.

5. In an electrolytic level control device for storage batteries, a cell having a filling opening therein; a filling passage extending downwardly from said opening into said cell, the walls of the passage forming a substantially air-tight space outside the passage between the bottom of the passage and the top of the cell; a baffle in said passage; an opening in said baffle communicating with the interior of the cell; a tube extending from said opening into the cell; a vertical slot in said tube which extends from the baffle opening, said slot extending to and through the baffle, forming a vent of such dimensions that water flowing over it tends to form a seal; and a float slidably mounted and fitting in said tube which extends from the baffle opening.

6. In an electrolytic level control device for storage batteries, a filling opening; a filling passage extending downwardly from said opening into the cell, the walls of the passage forming a substantially air-tight space outside the passage between the bottom of the passage and the top of the cell; a baffle in said passage; an opening in said baffle communicating with the interior of the cell; an elongated float slidably mounted in the baffle, and fitting the side walls of said opening, the lower end of said float extending into the interior of the battery below the full water level; and a vent extending between the said passage and the air space within the top of the cell, said vent being of such dimensions that water flowing over it tends to form a seal.

7. In an electrolytic level control device for storage batteries, a filling opening; a filling passage extending downwardly from said opening into the cell, the walls of the passage forming a substantially air-tight space outside the passage between the bottom of the passage and the top of the cell; a baffle in said passage; an opening in said baffle communicating with the interior of the cell; a tube extending from said baffle into the cell; an elongated float fitting the inside of the baffle tube so closely that when water is poured on the baffle a film will tend to form, restraining the float from sliding in the tube until pressure is applied thereto; and a vent extending between the said filling passage and the air space within the top of the cell, said vent being of such dimensions that water flowing over it tends to form a seal and the vent being so located relative to the baffle that the baffle directs water poured on it over the vent.

8. In an electrolytic level control device for storage batteries, a filling opening; a filling passage extending downwardly from said opening into the cell, the walls of the passage forming a substantially air-tight space outside the passage between the bottom of the passage and the top of the cell; a baffle in said passage; an opening in said baffle communicating with the interior of the cell; a tube extending from said baffle into the cell; and an elongated float fitting the inside of the baffle tube so closely that when water is poured on the baffle a seal will form over the space or crevice between the float and walls of the baffle tube to prevent the escape of air from within the cell.

9. In an electrolytic level control device for storage batteries, a filling opening; a filling passage extending downwardly from said opening into the cell, the walls of the passage forming a substantially air-tight space outside the passage between the bottom of the passage and the top of the cell; a shoulder in said passage above the lower end of said filling passage; an opening in said shoulder communicating with the interior of the cell; and a float slidably mounted in said shoulder, closing the said opening, said float fitting the sides of the opening so closely that when water is poured on the shoulder a seal will form over the space or crevice between the float and the sides of the opening to prevent the escape of air from within the cell.

10. In an electrolytic level control device for storage batteries, a filling opening; a filling passage extending downwardly from said opening into the cell, the walls of the passage forming a substantially air-tight space outside the passage between the bottom of the passage and the top of the cell; a shoulder in said passage above the lower end of said filling passage; an opening in said shoulder communicating with the interior of the cell; a float slidably mounted in said shoulder, closing the said opening, said float fitting the sides of the opening so closely that when water is poured on the shoulder a seal will form over the space or crevice between the float and the sides of the opening to prevent the escape of air from within the cell; and a member extending downwardly from the opening in the shoulder and forming a guide for said float.

11. In an electrolytic level control device for storage batteries, a cell having a filling opening therein, a filling passage formed by walls which extend downwardly from said opening into the cell and form a closed air space within the top of said cell outside said passage, a shoulder being formed in the walls of said passageway between the upper and lower ends thereof and forming a baffle in said passage; and a vent extending through the shoulder into the air space on the top of the cell, said vent being of such dimensions that water flowing over it tends to form a seal preventing escape of air through said vent when water is being poured into the battery.

JULIUS SANDUSKY.